United States Patent
Li et al.

(10) Patent No.: US 11,600,851 B2
(45) Date of Patent: Mar. 7, 2023

(54) SOLID-STATE ELECTROLYTES AND METHODS FOR MAKING THE SAME

(71) Applicant: GM GLOBAL TECHNOLOGY OPERATIONS LLC, Detroit, MI (US)

(72) Inventors: Zhe Li, Shanghai (CN); Yong Lu, Shanghai (CN); Xiaochao Que, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 415 days.

(21) Appl. No.: 16/786,469

(22) Filed: Feb. 10, 2020

(65) Prior Publication Data
US 2021/0111426 A1 Apr. 15, 2021

(30) Foreign Application Priority Data
Oct. 15, 2019 (CN) .......................... 201910977479.7

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ......... H01M 10/0562; H01M 10/0525; H01M 2300/0068; H01M 10/0561;
(Continued)

(56) References Cited

U.S. PATENT DOCUMENTS

| 10,297,885 B2 | 5/2019 | Gayden et al. |
| 10,826,139 B2 | 11/2020 | Rich et al. |

(Continued)

FOREIGN PATENT DOCUMENTS

| CN | 111908431 A | 11/2020 |
| CN | 112670559 A | 4/2021 |

(Continued)

OTHER PUBLICATIONS

Li, Zhe et al., "One-pot pyrolysis of lithium sulfate and graphene nanoplatelet aggregates: in situ formed Li2S/graphene composite for lithium-sulfur batteries," Nanoscale, 2015, 7, pp. 14385-14392 (Published Jul. 31, 2015); DOI: 10.1039/c5nr03201f.

(Continued)

*Primary Examiner* — Gary D Harris
(74) *Attorney, Agent, or Firm* — Harness, Dickey & Pierce, P.L.C.

(57) ABSTRACT

The present disclosure relates to solid-state electrolytes and methods of making the same. The method includes admixing a sulfate precursor including one or more of $Li_2SO_4$ and $Li_2SO_4 \cdot H_2O$ with one or more carbonaceous capacitor materials. The first admixture is calcined to form an electrolyte precursor that is admixed with one or more additional components to form the solid-state electrolyte. When a ratio of the sulfate precursor to the one or more carbonaceous capacitor materials in the first admixture is about 1:2, the electrolyte precursor consists essentially of $Li_2S$. When a ratio of the sulfate precursor to the one or more carbonaceous capacitor materials in the first admixture is less than about 1:2, the electrolyte precursor is a composite precursor including a solid-state capacitor cluster including the one or more carbonaceous capacitor materials and a sulfide coating including $Li_2S$ disposed on one or more exposed surfaces of the solid-state capacitor cluster.

16 Claims, 2 Drawing Sheets

Figure 1:
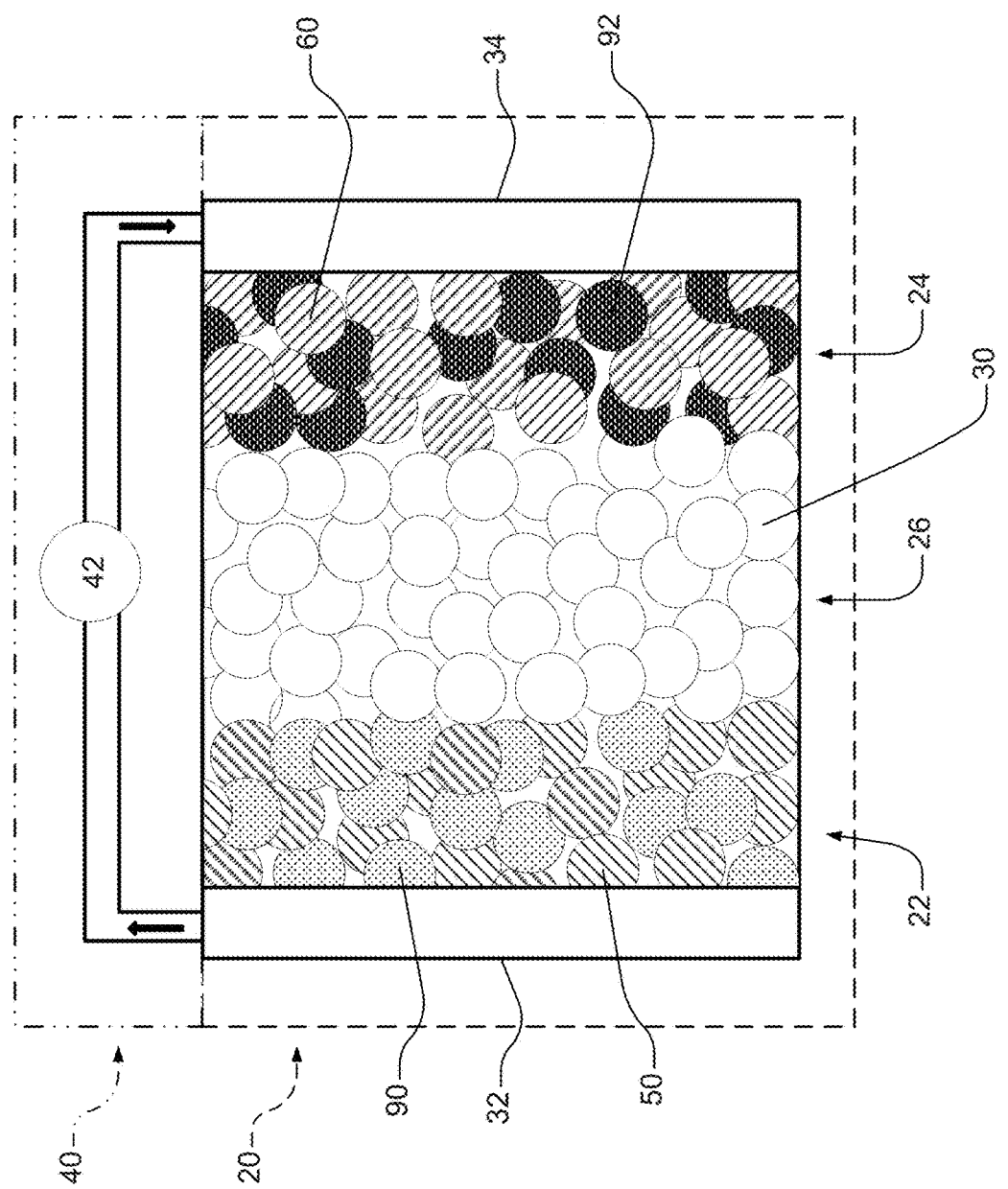

(58) Field of Classification Search
CPC ....... H01M 2300/0065; H01M 4/0471; H01M 4/583; H01G 11/46; H01G 11/38; H01G 11/34; H01G 11/06; H01G 11/36; H01G 11/50; H01G 11/56; Y02E 60/10
USPC .......................................................... 429/323
See application file for complete search history.

(56) References Cited

U.S. PATENT DOCUMENTS

| | | | |
|---|---|---|---|
| 11,171,365 | B2 | 11/2021 | Li et al. |
| 11,205,798 | B2 | 12/2021 | Li et al. |
| 2013/0337347 | A1* | 12/2013 | Pol .................. H01M 4/583 568/18 |
| 2018/0034094 | A1 | 2/2018 | Liu et al. |
| 2018/0287164 | A1 | 10/2018 | Liu et al. |
| 2019/0061555 | A1 | 2/2019 | Liu et al. |
| 2019/0067754 | A1 | 2/2019 | Gu et al. |
| 2019/0074510 | A1 | 3/2019 | Zhang et al. |
| 2019/0115622 | A1 | 4/2019 | Kwon et al. |
| 2019/0157659 | A1 | 5/2019 | Liu et al. |
| 2019/0341648 | A1 | 11/2019 | Wu et al. |
| 2019/0372127 | A1 | 12/2019 | Li et al. |
| 2019/0372186 | A1 | 12/2019 | Kong et al. |
| 2021/0065992 | A1 | 3/2021 | Lu et al. |
| 2021/0110979 | A1 | 4/2021 | Que et al. |
| 2021/0151260 | A1 | 5/2021 | Kong et al. |
| 2021/0151809 | A1 | 5/2021 | Kong et al. |

FOREIGN PATENT DOCUMENTS

| | | |
|---|---|---|
| DE | 69404715 T2 | 2/1998 |
| DE | 60006236 T2 | 7/2004 |
| DE | 102016200528 A1 | 12/2016 |
| WO | 2018132992 A1 | 7/2018 |
| WO | 2019200609 A1 | 10/2019 |
| WO | 2019204964 A1 | 10/2019 |
| WO | 2019218327 A1 | 11/2019 |

OTHER PUBLICATIONS

German Office Action dated Mar. 31, 2021 corresponding to DE 10 2020 125 123.8.

* cited by examiner

SOLID-STATE ELECTROLYTES AND METHODS FOR MAKING THE SAME

CROSS-REFERENCE TO RELATED APPLICATIONS

This application claims the benefit and priority of Chinese Patent Application No. 201910977479.7, filed Oct. 15, 2019. The entire disclosure of the above application is incorporated herein by reference.

INTRODUCTION

This section provides background information related to the present disclosure which is not necessarily prior art.

The present disclosure relates to sulfide-containing solid-state electrolytes and sulfide-containing solid-state composite electrolytes, as well as electrochemical cells and electrodes including the same, and methods of making or fabricating the same.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium ion batteries include at least two electrodes and an electrolyte and/or separator. One of the two electrodes serves as a positive electrode or cathode and the other electrode serves as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Solid-state batteries offer several advantages, such as long shelf life with low self-discharge, operation with simple thermal management systems, a reduced need for packaging, and higher energy densities over wider temperature ranges, by way of non-limiting example. Further, solid-state electrolytes are generally non-volatile and non-flammable, so as to allow cells to be cycled under harsher conditions without experiencing diminished potential or thermal runaway, which can potentially occur with the use of liquid electrolytes. Sulfide-based solid-state electrolytes are attractive for having superionic conductivity (for example as high as about $10^{-2}$ S/cm) and deformability. However, many sulfide-based solid-state electrolytes (such as $Li_7P_3S_{11}$) have prohibitively high costs. Accordingly, it would be desirable to develop sulfide-based solid-state electrolyte materials and methods having desirable conductivity and deformability, as well as affordability.

SUMMARY

This section provides a general summary of the disclosure, and is not a comprehensive disclosure of its full scope or all of its features.

In various aspects, the present disclosure provides a method of making a solid-state electrolyte. The method includes admixing a sulfate precursor with one or more carbonaceous capacitor materials to form a first admixture. The sulfate precursor includes one or more of lithium sulfate ($Li_2SO_4$) and lithium sulfate hydrate ($Li_2SO_4 \cdot H_2O$). The method further includes calcining the first admixture at a temperature of greater than or equal to about 700° C. to less than or equal to about 1200° C. for a first time greater than or equal to about 10 minutes to less than or equal to about 24 hours to form an electrolyte precursor comprising $Li_2S$. The electrolyte precursor is admixed with one or more additional components selected from the group consisting of: phosphorus pentasulfide ($P_2S_5$), germanium sulfide ($GeS_2$), silicon disulfide ($SiS_2$), tin(IV) sulfide ($SnS_2$), arsenic pentasulfide ($As_2S_5$), nickel sulfide ($Ni_3S_2$), lithium fluoride (LiF), lithium chloride (LiCl), lithium bromide (LiBr), lithium iodide (LiI), sulfur (S), phosphorus (P), and combinations thereof to form the solid-state electrolyte.

In one aspect, a ratio of the sulfate precursor to the one or more carbonaceous capacitor materials in the first admixture may be about 1:2.

In one aspect, the electrolyte precursor may consist essentially of lithium sulfide ($Li_2S$).

In one aspect, the solid-state electrolyte may consist essentially of one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof.

In one aspect, a ratio of the sulfate precursor to the one or more carbonaceous capacitor materials in the first admixture may be less than about 1:2.

In one aspect, the electrolyte precursor may be a composite precursor including a solid-state capacitor cluster and a sulfide coating disposed on one or more exposed surfaces of the solid-state capacitor cluster. The solid-state capacitor cluster may include the one or more carbonaceous capacitor materials. The sulfide coating may include lithium sulfide ($Li_2S$).

In one aspect, the solid-state electrolyte may be a composite electrolyte including a solid-state capacitor cluster and a sulfide coating disposed on one or more exposed surfaces of the solid-state capacitor cluster. The solid-state capacitor cluster may include the one or more carbonaceous capacitor materials. The sulfide coating may include one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}$ $S_{10.7}I_{0.3}$, $Li_{1035}[Sn_{0.27}Si_{1.08}]P_{1.65}S_{12}$, and combinations thereof.

In one aspect, the solid-state electrolyte may include greater than about 0 wt. % to less than or equal to about 60 wt. % of the carbonaceous capacitor materials and greater than or equal to about 40 wt. % to less than or equal to about 100 wt. % of the sulfide coating.

In one aspect, the sulfide coating may have a thickness of greater than or equal to about 1 nm to less than or equal to about 50 μm. The solid-state electrolyte may have an average particle diameter of greater than or equal about 2 nm to less than or equal to about 100 μm.

In one aspect, the one or more carbonaceous capacitor materials may be selected from the group consisting of: activated carbon (AC), graphene, porous carbon, carbon nanotubes (CNTs), and combinations thereof.

In one aspect, admixing the electrolyte precursor with the one or more additional components may include milling a second admixture including the electrolyte precursor and the one or more additional components at a speed greater than or equal to about 50 rpm to less than or equal to about 1500 rpm for a second time greater than or equal to about 10 minutes to less than or equal to about 72 hours; and heating the milled second admixture to a second temperature greater than or equal to about 100° C. to less than or equal to about 1200° C. for a first time greater than or equal to about 10 minutes to less than or equal to about 24 hours to form the solid-state electrolyte.

In one aspect, admixing the electrolyte precursor with the one or more additional components may include dispersing the electrolyte precursor and the one or more additional components in a solvent to form a dispersion; and removing liquid from the dispersion by exposing the second admixture to a second temperature greater than or equal to about 50° C. to less than or equal to about 1200° C. for a first time greater than or equal to about 10 minutes to less than or equal to about 48 hours to form the solid-state electrolyte.

In one aspect, the solvent may be selected from the group consisting of: tetrahydrofuran, acetonitrile, hydrazine, methanol, ethanol, ethyl acetate, N-methylformamide, 1,2-dimethyoxyethane, and combinations thereof.

In one aspect, admixing the electrolyte precursor with the one or more additional components may further include heating a second admixture including the electrolyte precursor and the one or more additional components to a second temperature greater than or equal to about 100° C. to less than or equal to about 1200° C. for a first time greater than or equal to about 10 minutes to less than or equal to about 24 hours; and quenching the second admixture to a third temperature greater than or equal to about −100° C. to less than or equal to about 100° C. to form the solid-state electrolyte.

In one aspect, admixing the sulfate precursor including the one or more of lithium sulfate ($Li_2SO_4$) and lithium sulfate hydrate ($Li_2SO_4.H_2O$) with the one or more carbonaceous capacitor materials to form the first admixture includes a milling process.

In one aspect, admixing the sulfate precursor including the one or more of lithium sulfate ($Li_2SO_4$) and lithium sulfate hydrate ($Li_2SO_4.H_2O$) with the one or more carbonaceous capacitor materials to form the first admixture includes dispersing the sulfate precursor and the one or more carbonaceous capacitor materials in a solvent to form a suspension; and adding a precipitant in a dropwise manner to the suspension.

In various other aspects the present disclosure provides a composite solid-state electrolyte material including a plurality of electrolyte particles. Each electrolyte particle includes a solid-state capacitor cluster and a sulfide coating disposed on one or more exposed surfaces of the solid-state capacitor cluster. The solid-state capacitor cluster includes one or more of carbonaceous capacitor material particles. Each electrolyte particle may include greater than about 0 wt. % to less than or equal to about 60 wt. % of the carbonaceous capacitor material particles and greater than or equal to about 40 wt. % to less than or equal to about 100 wt. % of the sulfide coating.

In one aspect, the one or more carbonaceous capacitor material particles may be selected from the group consisting of activated carbon (AC), graphene, porous carbon, carbon nanotubes (CNTs), and combinations thereof; and the sulfide coating may include one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof.

In one aspect, the sulfide coating may have a thickness of greater than or equal to about 1 nm to less than or equal to about 50 μm and each electrolyte particle may have an average particle diameter of greater than or equal about 2 nm to less than or equal to about 100 μm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
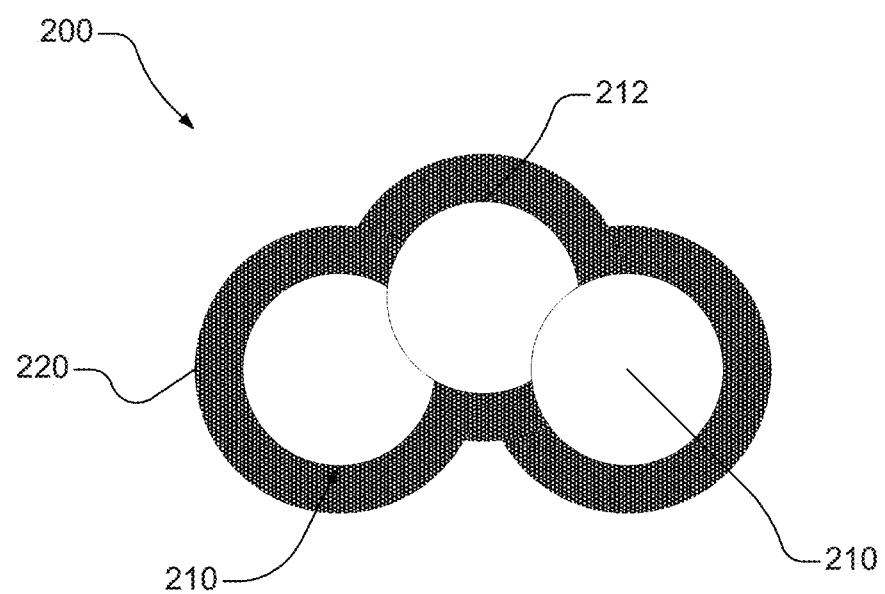

FIG. 1 is an example schematic illustration of a solid-state electrochemical cell having a sulfide-containing, solid-state electrolyte prepared in accordance with various aspects of the present disclosure; and FIG. 2 is an example schematic illustration of a solid-state, sulfide-containing composite electrolyte prepared in accordance with various aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure relates to sulfide-containing solid-state electrolytes and sulfide-containing solid-state composite electrolytes, as well as electrochemical cells and electrodes including the same, and methods of making or fabricating the same. Such methods include using mixtures of comparatively low-cost precursors, mixtures with different compositional ratios may form different solid-state electrolytes. For example, some mixtures spawn homogeneous solid-state electrolytes, for example including one or more electrolyte materials, while other mixtures spawn heterogeneous or composite solid-state electrolytes that may, for example, include one or more electrolyte materials and one or more capacitor components. Retaining some residual capacitor components may improve the lithium conduction, including absorbing and desorbing. Within the solid-state battery, the residual capacitor component may also enhance the power capabilities and power response of the cell. Electrodes and electrochemical cells including such electrolytes may be used in, for example, automotive or other vehicles (e.g., motorcycles, boats), but may also be used in electrochemical cells used in a variety of other industries and applications, such as consumer electronic devices, by way of non-limiting example.

An exemplary and schematic illustration of an all-solid-state electrochemical cell 20 (also referred to herein as "the battery"), that cycles lithium ions is shown in FIG. 1. The battery 20 includes a negative electrode 22, a positive electrode 24, and a separator 26 disposed between the electrodes 22, 24. The separator 26 may be formed by a solid-state electrolyte. For example, as illustrated, the separator 26 may be defined by a first plurality of solid-state electrolyte particles 30. In this manner, the first plurality of solid-state electrolyte particles 30 provides electrical separation and prevents physical contact between the electrodes 22, 24, while providing a minimal resistance path for internal passage of lithium ions, and in certain instances, related anions. As discussed in further detail below, in various instances second and/or third pluralities of solid-state electrolyte particles 90, 92 may be mixed with one or both of the electrodes 22, 24 so as to form a continuous solid-state electrolyte network.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). The positive current collector 34 may be a metal foil, metal grid or screen, or expanded metal comprising aluminum or any other appropriate electrically conductive material known to those of skill in the art. The negative current collector 32 may be a metal foil, metal grid or screen, or expanded metal comprising copper or any other appropriate electrically conductive material known to those of skill in the art.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium. The chemical potential difference between the negative electrode 22 and the positive electrode 24 drives electrons produced by the oxidation of inserted lithium at the negative electrode 22 through the external circuit 40 towards the positive electrode 24. Lithium ions, which are also produced at the negative electrode 22, are concurrently transferred through the separator 26 towards the positive electrode 24. The electrons flow through the external circuit 40, and the ions migrate across the separator 26 to the positive electrode 24, where they may be plated, reacted, or intercalated. The electric current passing through the external circuit 40 can be harnessed and directed through the load device 42 (in the direction of the block arrows) until the lithium or sodium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across the separator 26 back towards the negative electrode 22, reunite at the negative electrode 22 and replenish it with lithium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators. In many of the configurations of the battery 20, each of the negative electrode current collector 32, the negative electrode 22, separator 26, the positive electrode 24, and the positive electrode current collector 34 are prepared as relatively thin layers (for example, from several microns to a millimeter or less in thickness) and assembled in layers connected in electrical parallel arrangement (such as bipolar stacking) to provide a suitable electrical energy and power package. In various other instances, the battery 20 may include electrodes 22, 24, as well as the current collectors 32, 34 and the separator 26, may be connected in series so as to achieve desirable battery power and energy.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular applications for which it is designed. Battery-powered vehicles and handheld consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate an electric current to the load device 42 that can be operatively connected to the external circuit 40. The load device 42 may be powered fully or partially by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

With further reference to FIG. 1, the separator 26 provides electrical separation—preventing physical contact—between the negative electrode 22 (i.e., anode) and the positive electrode 24 (i.e., cathode). The separator 26 also provides a minimal resistance path for internal passage of ions. In various aspects, as noted above, the separator 26 may be formed by a solid-state electrolyte. For example, as illustrated, the separator 26 may be defined by a first plurality of solid-state electrolyte particles 30. The first plurality of solid-state electrolyte particles 30 may be disposed in one or more layers or composites so as to define a three-dimensional structure of the separator 26. For example, the separator 26 may have a thickness greater than or equal to about 1 μm to less than or equal to about 1 mm, and in certain aspects, optionally greater than or equal to about 5 μm to less than or equal to about 100 μm.

The first plurality of solid-state electrolyte particles 30 may comprise one or more sulfide-containing electrolyte materials. For example, in various aspects, the electrolyte system defined by the first plurality of solid-state electrolyte particles 30 may be pseudobinary, pseudoternary, or pseudoquaternary. $Li_2S$—$P_2S_5$ and $Li_2S$—$SnS_2$ systems are example pseudobinary electrolyte systems. $Li_2S$—$P_2S_5$ electrolyte systems may comprise one or more sulfide-containing electrolyte materials such as $Li_3PS_4$, $Li_7P_3S_{11}$, and $Li_{9.6}P_3S_{12}$. $Li_2S$—$SnS_2$ electrolyte systems may comprise a sulfide-containing electrolyte material such as $Li_4SnS_4$. $Li_2S$—$P_2S_5$—$GeS_2$ systems, $Li_2S$—$P_2S_5$—LiX systems (where X is one of fluorine (F), chloride (Cl), bromide (Br) and iodide (I)), $Li_2S$—$As_2S_5$—$SnS_2$ systems are example pseudoternary electrolyte systems. $Li_2S$—$P_2S_5$—$GeS_2$ electrolyte systems may comprise one or more sulfide-containing electrolyte materials such as $Li_{3.25}Ge_{0.25}P_{0.75}S_4$ and $Li_{10}GeP_2S_{12}$. $Li_2S$—$P_2S_5$—LiX electrolyte systems (where X is one of fluorine (F), chloride (Cl), bromide (Br), and iodide (I)) may comprise one or more sulfide-containing electrolyte materials such as $Li_6PS_5Br$, $Li_6PS_5Cl$. $Li_7P_2S_8I$, and $Li_4PS_4I$. $Li_2S$—$As_2S_5$—$SnS_2$ electrolyte systems may comprise a sulfide-containing electrolyte material such as $Li_{3.833}Sn_{0.833}As_{0.166}S_4$ (for example, $1.9165Li_2S\text{-}0.0833As_2S_5\text{-}0.833SnS_2$). Pseudoquaternary electrolyte systems may comprise one or more sulfide-containing electrolyte materials such as $Li_{9.54}Si_{1.74}P_{1.44}S_{11.7}Cl_{0.3}$, $Li_7P_{2.9}Mn_{0.1}S_{10.7}I_{0.3}$, and $Li_{1035}[Sn_{0.27}Si_{1.08}]P_{1.65}S_{12}$. In this fashion, the first plurality of solid-state electrolyte particles 30 may comprise one or more sulfide-containing electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$. $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof.

The negative electrode 22 may be formed from a lithium host material that is capable of functioning as a negative terminal of a lithium ion battery. For example, in certain variations, the negative electrode 22 may be defined by a plurality of negative solid-state electroactive particles 50. In certain instances, as illustrated, the negative electrode 22 is a composite comprising a mixture of the negative solid-state electroactive particles 50 and a second plurality of solid-state electrolyte particles 90. For example, the negative electrode 22 may include greater than or equal to about 10 wt. % to less than or equal to about 95 wt. %, and in certain aspects, optionally greater than or equal to about 50 wt. % to less than or equal to about 90 wt. %, of the negative solid-state electroactive particles 50 and greater than or equal to about 5 wt. % to less than or equal to about 90 wt. %, and in certain aspects, optionally greater than or equal to about 10 wt. % to less than or equal to about 40 wt. %, of the second plurality of solid-state electrolyte particles 90. The negative solid-state electroactive particles 50 and the second plurality of solid-state electrolyte particles 90 may be disposed in one or more layers or composites so as to define the three-dimensional structure of the negative electrode 22.

In certain variations, the negative solid-state electroactive particles 50 may be lithium-based comprising, for example, a lithium metal and/or lithium alloy. In other variations, the negative solid-state electroactive particles 50 may be silicon-based, comprising silicon, for example, a silicon alloy, silicon oxide, or combinations thereof that may be further mixed, in certain instances, with graphite. In still other variations, the negative solid-state electroactive particles 50 may be carbonaceous-based comprising one or more of graphite, graphene, carbon nanotubes (CNTs), and combinations thereof. In still further variations, the negative solid-state electroactive particles 50 may comprise lithium titanium oxide ($Li_4Ti_5O_{12}$) and/or one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \le x \le 2$, $0 \le y \le 24$, and $0 \le z \le 64$), and one or more metal sulfides (such as iron sulfide (FeS)) and/or titanium sulfide ($TiS_2$)).

In various aspects, the second plurality of solid-state electrolyte particles 90 may be the same or different from the first plurality of solid-state electrolyte particles 30. For example, like the first plurality of solid-state electrolyte particles 30, the second plurality of solid-state electrolyte particles 90 may comprise one or more sulfide-containing electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$. $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}Si_{10.7}I_{0.3}$, $Li_{1035}[Sn_{0.27}Si_{1.08}]P_{1.65}S_{12}$, and combinations thereof. In such instances, the negative solid-state electroactive particles 50 and/or the second plurality of solid-state electrolyte particles 90 may be optionally intermingled with one or more electrically conductive materials that provide an electron conduction path and/or at least one polymeric binder material that improves the structural integrity of the negative electrode 22.

For example, the negative solid-state electroactive particles 50 and/or the second plurality of solid-state electrolyte particles 90 may be optionally intermingled with binders, like styrene ethylene butylene styrene copolymers (SEBS), styrene butadiene styrene copolymers (SBS), polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like. In certain variations, conductive additives may include, for example, one or more non-carbon conductive additives selected from simple oxides (such as $RuO_2$, $SnO_2$, ZnO, $Ge_2O_3$), superconductive oxides (such as $YBa_2Cu_3O_7$, $La_{0.75}Ca_{0.25}MnO_3$), carbides (such as $SiC_2$), silicides (such as $MoSi_2$), and sulfides (such as $CoS_2$).

In various aspects, the negative electrode 22 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders.

In various other aspects, as illustrated in FIG. 2, the second plurality of solid-state electrolyte particles 90 may comprise solid-state composite electrolyte particles 200. Each composite electrolyte particle 200 may include a solid-state capacitor material or cluster 210 comprising one or more carbonaceous capacitor material particles 212 and a sulfide coating disposed on one or more exposed surfaces of the capacitor clusters 210. For example, each composite electrolyte particle 200 may comprise greater than about 0 wt. % to less than or equal to about 60 wt. %, and in certain aspects, optionally greater than about 0 wt. % to less than or equal to about 30 wt. %, of the carbonaceous capacitor material particles 212 and greater than or equal to about 40 wt. % to less than or equal to about 100 wt. %, and in certain aspects, optionally greater than or equal to about 70 wt. % to less than or equal to about 100 wt. %, of the sulfide coating 220.

Each of the one or more carbonaceous capacitor material particles 212 may have an average particle diameter of greater than or equal to about 1 nm to less than or equal to about 50 μm, and in certain aspects, optionally of greater than or equal to about 10 nm to less than or equal to about 20 μm, and the sulfide coating 220 may have a thickness greater than or equal to about 1 nm to less than or equal to about 50 μm, and in certain aspects, optionally greater than or equal to about 10 nm to less than or equal to about 20 μm, such that an average particle diameter of the composite electrolyte particles 200 is greater than or equal about 2 nm to less than or equal to about 100 μm, optionally greater than or equal about 20 nm to less than or equal to about 40 μm, and in certain aspects, optionally greater than or equal about 500 nm to less than or equal to about 2 μm.

In certain variations, the one or more carbonaceous capacitor material particles 212 may include one or more carbonaceous materials selected from the group consisting of activated carbon (AC), graphene, porous carbon, carbon nanotubes (CNTs), and combinations thereof. Such carbonaceous materials have some electrical conductivity, for example, greater than or equal to about $10^2$ S/m to less than or equal to about $10^8$ S/m. The electrical conductivity of the one or more carbonaceous materials may improve electronic conduction within the negative electrode 22 such that other electrically conductive materials or additives may be omitted. The sulfide coating may comprise one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$. $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof.

Again with renewed reference to FIG. 1, the positive electrode 24 may be formed from a lithium-based or sodium-based electroactive material that can undergo lithium intercalation and deintercalation (e.g., alloying and dealloying and/or plating and striping) while functioning as the positive terminal of the battery 20. For example, in certain variations, the positive electrode 24 may be defined by a plurality of positive solid-state electroactive particles 60. In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 10 wt. % to less than or equal to about 95 wt. %, and in certain aspects, optionally greater than or equal to about 50 wt. % to less than or equal to about 90 wt. %, of the positive solid-state electroactive particles 60 and greater than or equal to about 5 wt. % to less than or equal to about 70 wt. %, and in certain aspects, optionally greater than or equal to about 10 wt. % to less than or equal to about 30 wt. %, of the third plurality of solid-state electrolyte particles 92. The positive solid-state electroactive particles 60 and the third plurality of solid-state electrolyte particles 92 may be disposed in one or more layers or composites so as to define the three-dimensional structure of the positive electrode 24.

In certain variations, the positive electrode 24 may be one of a layered-oxide cathode, a spinel cathode, and a polyanion cathode. For example, layered-oxide cathodes (e.g., rock salt layered oxides) may include positive solid-state electroactive particles 60 comprising one or more lithium-based positive electroactive materials selected from, for example, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes may include positive solid-state electroactive particles 60 comprising one or more lithium-based positive electroactive materials selected from, for example, $LiMn_2O_4$ (LMO) and $LiNi_{0.5}Mn_{1.5}O_4$. Polyanion cathodes may include positive solid-state electroactive particles 60 comprising a phosphate such as $LiFePO_4$, $LiVPO_4$, $LiV_2(PO_4)_3$, $Li_2FePO_4F$, $Li_3Fe_2(PO_4)_4$, or $Li_3V_2(PO_4)F_3$ and/or a silicate such as $LiFeSiO_4$, $Li_2MnSiO_4$, and $LiMnSiO_4F$.

In various other instances, olivine type cathodes may include positive solid-state electroactive particles 60 comprising one or more lithium-based positive electroactive materials selected from, for example, $LiV_2(PO_4)_3$, $LiFePO_4$, $LiCoPO_4$, and $LiMnPO_4$. Favorite type cathodes may include positive solid-state electroactive particles 60 comprising lithium-based positive electroactive materials such as $LiVPO_4F$. Borate type cathodes may include positive solid-state electroactive particles 60 comprising one or more lithium-based positive electroactive materials selected from, for example, $LiFeBO_3$, $LiCoBO_3$, and $LiMnBO_3$. In still further variations, the positive electrode 24 may comprise one or more other lithium-based positive electroactive materials, such as one or more of dilithium (2,5-dilithiooxy) terephthalate and polyimide. In certain aspects, the positive solid-state electroactive particles 60 may be optionally coated (for example by $LiNbO_3$ and/or $Al_2O_3$) and/or may be doped (for example by magnesium (Mg)).

In various aspects, the third plurality of solid-state electrolyte particles 92 may be the same or different from the first plurality of solid-state electrolyte particles 30 and/or the second plurality of solid-state electrolyte particles 90. For example, like the first plurality of solid-state electrolyte particles 30 and/or the second plurality of solid-state electrolyte particles 90, the third plurality of solid-state electrolyte particles 92 may comprise one or more sulfide-containing electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$. $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof. In such instances, the positive solid-state electroactive particles 60 and/or the third plurality of solid-state electrolyte particles 92 may be optionally intermingled with one or more electrically conductive materials that provide an electron conduction path and/or at least one polymeric binder material that improves the structural integrity of the positive electrode 24.

For example, the positive solid-state electroactive particles 60 may be optionally intermingled with binders, like styrene ethylene butylene styrene copolymers (SEBS), styrene butadiene styrene copolymers (SBS), polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders. Electrically conductive materials may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like.

The positive electrode 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders.

In various other aspects, as illustrated in FIG. 2, the third plurality of solid-state electrolyte particles 92, like the second plurality of solid-state electrolyte particles 90, may comprise solid-state composite electrolyte particles 200. The composite electrolyte particles 200 each comprise a solid-state capacitor cluster 210 comprising one or more carbonaceous capacitor material particles 212 and a sulfide coating disposed on one or more exposed surfaces of the capacitor clusters 210. The one or more carbonaceous capacitor material particles 212 may include one or more carbonaceous materials selected from the group consisting of activated carbon (AC), graphene, porous carbon, carbon nanotubes (CNTs), and combinations thereof. Such carbonaceous materials have some electrical conductivity, for example, greater than or equal to about $10^2$ S/m to less than or equal to about $10^8$ S/m. The electrical conductivity of the one or more carbonaceous materials may improve electronic conduction within the positive electrode 24 such that other electrically conductive materials or additives may be omitted. The sulfide coating may comprise one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof.

In various aspects, the present disclosure provides a method of making or fabricating a solid-state electrolyte, for example the solid-state composite electrolyte particles 200 illustrated in FIG. 2. The method may include admixing a sulfate precursor with one or more carbonaceous capacitor materials, for example using a hand milling or mechanical milling process (such as ball milling or vibration milling) or a precipitation process. Such precipitation processes may include first dispersing the sulfate precursor and the one or more carbonaceous capacitor materials in a solvent, for example water, to form a suspension and adding a precipitant, such as ethanol, in a dropwise manner into the suspension. In such instances, another heating step may be required to remove any residual solvent. The one or more carbonaceous capacitor materials may be selected from the group consisting of: activated carbon (AC), graphene, porous carbon, carbon nanotubes (CNTs), and combinations thereof. The sulfate precursor may comprise lithium sulfate ($Li_2SO_4$) and/or lithium sulfate hydrate ($Li_2SO_4 \cdot H_2O$), for example $Li_2SO_4 \cdot xH_2O$ where x is greater than or equal to about 1. In certain variations, the (first) admixture may comprise greater than or equal to about 20 wt. % to less than or equal to about 85 wt. %, and in certain aspects, optionally greater than or equal to about 40 wt. % to less than or equal to about 85 wt. % of the sulfate precursor; and greater than or equal to about 15 wt. % to less than or equal to about 80 wt. %, and in certain aspects, optionally greater than or equal to about 15 wt. % to less than or equal to about 60 wt. % of the one or more carbonaceous capacitor materials.

When the (first) admixture is exposed to a (first) temperature greater than or equal to about 700° C. to less than or equal to about 1200° C., and in certain aspects, optionally greater than or equal to about 750° C. to less than or equal to about 900° C., for a first time or duration greater than or equal to about 10 minutes to less than or equal to about 24 hours, and in certain aspects, optionally greater than or equal to about 30 minutes to less than or equal to about 12 hours, an electrolyte precursor may be formed, for example by reducing the sulfate precursor using the carbonaceous capacitor materials. In certain variations, such calcination may induce the following reduction:

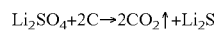

$$Li_2SO_4 + 2C \rightarrow 2CO_2\uparrow + Li_2S$$

In certain variations, the admixture may comprise a ratio of the sulfate precursor to the one or more carbonaceous capacitor materials that is about 1:2 (molar ratio). In other variations, the admixture may comprise a ratio of the sulfate precursor to the one or more carbonaceous capacitor materials that is less than about 1:2 (molar ratio). In instances where a ratio of the sulfate precursor to the one or more carbonaceous capacitor materials is about 1:2, a full amount of the one or more carbonaceous capacitor materials may be consumed such that the electrolyte precursor consists essentially of lithium sulfide ($Li_2S$). The term "consists essentially of" means that the electrolyte precursor in this instance, substantially excludes amounts of the one or more carbonaceous capacitor materials that materially affect the basic and novel characteristics of the electrolyte precursor. However, as the skilled artisan will recognize in certain variables, the electrolyte precursor may include trace amounts of the one or more carbonaceous capacitor materials and/or various contaminants.

In instances where a ratio of the sulfate precursor to the one or more carbonaceous capacitor materials is less than about 1:2, an amount of the one or more carbonaceous capacitor materials less than its full amount may be consumed, for example about 17.91 wt. % of the original carbonaceous capacitor material may remain. In such instances, the electrolyte precursor may comprise a capacitor cluster comprising the one or more carbonaceous capacitor materials and a lithium sulfide coating disposed on one or more exposed surfaces of the solid-state capacitor cluster or particle. The sulfide coating may comprise lithium sulfide ($Li_2S$) and, in certain aspects, the electrolyte precursor may comprise greater than or equal to about 10 wt. % to less than or equal to about 100 wt. %, and in certain aspects, optionally greater than or equal to about 30 wt. % to less than or equal to about 100 wt. % of the lithium sulfide coating; and greater than about 0 wt. % to less than or equal to about 90 wt. %, and in certain aspects, optionally greater than about 0 wt. % to less than or equal to about 70 wt. % of the one or more carbonaceous capacitor materials.

In each instance, the method may further comprise admixing the electrolyte precursor with one or more additional components, for example using one of a milling method, a wet-chemistry method, and a melt-quenching method. The one or more additional components may be selected from the group consisting of: phosphorus pentasulfide ($P_2S_5$), germanium sulfide ($GeS_2$), silicon disulfide ($SiS_2$), tin(IV) sulfide ($SnS_2$), arsenic pentasulfide ($As_2S_5$), nickel sulfide ($Ni_3S_2$), lithium fluoride (LiF), lithium chloride (LiCl), lithium bromide (LiBr), lithium iodide (LiI), sulfur (S), phosphorus (P), and combinations thereof. For example, the (second) admixture may comprise greater than or equal to about 1 wt. % to less than or equal to about 90 wt. %, and in certain aspects, optionally greater than or equal to about 10 wt. % to less than or equal to about 80 wt. % of the electrolyte precursor; and greater than or equal to about 10 wt. % to less than or equal to about 99 wt. %, and in certain aspects, optionally greater than or equal to about 20 wt. % to less than or equal to about 90 wt. % of one or more additional components. The one or more additional components react with lithium sulfide ($Li_2S$), for example present in the electrolyte precursor, to form one or more electrolyte materials. The one or more electrolyte materials may be selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof. In certain variations, the weight percentage of the electrolyte precursor may depend on the desired electrolyte. For example, if it is desirable that the electrolyte comprises $Li_7P_3S_{11}$, the weight percentage of $Li_2S$ may be about 32.6 wt. % and the additional component ($P_2S_5$) may be about 67.4 wt. %.

In certain variations, admixing the electrolyte precursor with one or more additional components may comprise forming an admixture in a ball milling container and ball milling the admixture. Ball milling may be performed at a speed greater than or equal to about 50 rpm to less than or equal to about 1500 rpm. The ball milling may be performed for a time greater than or equal to about 10 minutes to less than or equal to about 72 hours, and in certain aspects, optionally greater than or equal to about 1 hour to less than or equal to about 24 hours. In certain instances, the milled admixture may be further heated. For example, the milled admixture may be heated to a (second) temperature greater than or equal to about 100° C. to less than or equal to about 1200° C., and in certain aspects, optionally greater than or equal to about 150° C. to less than or equal to about 700° C., for a first time greater than or equal to about 10 minutes to less than or equal to about 24 hours, and in certain aspects, optionally greater than or equal to about 1 hour to less than or equal to about 12 hours, to form the solid-state electrolyte.

In other variations, admixing the electrolyte precursor with one or more additional components may comprise mixing or dispersing the electrolyte precursor and the one or more additional components in a solvent. In certain variations, for example, the solvent may be selected from the group consisting of: tetrahydrofuran, acetonitrile, hydrazine, methanol, ethanol, ethyl acetate, N-methylformamide, 1,2-dimethoxyethane, and combinations thereof. Liquid may be subsequently removed by exposing the dispersion to a (second) temperature greater than or equal to about 50° C. to less than or equal to about 1200° C., and in certain aspects, optionally greater than or equal to about 50° C. to less than or equal to about 200° C., for a first time greater than or equal to about 10 minutes to less than or equal to about 48 hours, and in certain aspects, optionally greater than or equal to about 30 minutes to less than or equal to about 12 hours, to form the solid-state electrolyte.

In still other variations, admixing the electrolyte precursor with one or more additional components may further comprise heating the (second) admixture to a high temperature and rapidly cooling or quenching the mixture. For example, the (second) admixture may be heated to a (second) temperature greater than or equal to about 100° C. to less than or equal to about 1200° C. and in certain aspects, optionally greater than or equal to about 400° C. to less than or equal to about 900° C., for a first time greater than or equal to about 10 minutes to less than or equal to about 24 hours, and in certain aspects, optionally greater than or equal to about 30 minutes to less than or equal to about 12 hours; and quickly cooled (quenched) to a (third) temperature greater than or equal to about −100° C. to less than or equal to about 100° C., and in certain aspects, optionally greater than or equal to about −50° C. to less than or equal to about 100° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a solid-state electrolyte, the method comprising:
   admixing a sulfate precursor comprising one or more of lithium sulfate ($Li_2SO_4$) and lithium sulfate hydrate ($Li_2SO_4 \cdot H_2O$) with one or more carbonaceous capacitor materials to form a first admixture;
   calcining the first admixture at a temperature of greater than or equal to about 700° C. to less than or equal to about 1200° C. for a first time greater than or equal to about 10 minutes to less than or equal to about 24 hours to form an electrolyte precursor comprising lithium sulfide ($Li_2S$); and
   admixing the electrolyte precursor with one or more additional components selected from the group consisting of: phosphorus pentasulfide ($P_2S_5$), germanium sulfide ($GeS_2$), silicon disulfide ($SiS_2$), tin (IV) sulfide ($SnS_2$), arsenic pentasulfide ($As_2S_5$), nickel sulfide ($Ni_3S_2$), lithium fluoride (LiF), lithium chloride (LiCl), lithium bromide (LiBr), lithium iodide (LiI), sulfur (S), phosphorus (P), and combinations thereof to form the solid-state electrolyte.

2. The method of claim 1, wherein a ratio of the sulfate precursor to the one or more carbonaceous capacitor materials in the first admixture is about 1:2.

3. The method of claim 2, wherein the electrolyte precursor consists essentially of lithium sulfide ($Li_2S$).

4. The method of claim 2, wherein the solid-state electrolyte consists essentially of one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$, and combinations thereof.

5. The method of claim 1, wherein a ratio of the sulfate precursor to the one or more carbonaceous capacitor materials in the first admixture is less than about 1:2.

6. The method of claim 5, wherein the electrolyte precursor is a composite precursor comprising a solid-state capacitor cluster and a sulfide coating disposed on one or more exposed surfaces of the solid-state capacitor cluster, wherein the solid-state capacitor cluster comprises the one or more carbonaceous capacitor materials and the sulfide coating comprises lithium sulfide ($Li_2S$).

7. The method of claim 5, wherein the solid-state electrolyte is a composite electrolyte comprising a solid-state capacitor cluster and a sulfide coating disposed on one or more exposed surfaces of the solid-state capacitor cluster, wherein the solid-state capacitor cluster comprises the one or more carbonaceous capacitor materials and the sulfide coating comprises one or more electrolyte materials selected from the group consisting of: $Li_3PS_4$, $Li_7P_3S_{11}$, $Li_{9.6}P_3S_{12}$, $Li_4SnS_4$, $Li_{3.25}Ge_{0.25}P_{0.75}S_4$, $Li_{10}GeP_2S_{12}$, $Li_6PS_5Br$, $Li_6PS_5Cl$, $Li_7P_2S_8I$, $Li_4PS_4I$, $Li_{3.833}Sn_{0.833}As_{0.166}S_4$, $Li_{11}Si_2PS_{12}$, $Li_{9.54}Si_{1.74}P_{1.44}S_{11.7}Cl_{0.3}$, $Li_7P_{2.9}Mn_{0.1}S_{10.7}I_{0.3}$, $Li_{1035}[Sn_{0.27}Si_{1.08}]P_{1.65}S_{12}$.

8. The method of claim 7, wherein the solid-state electrolyte comprises greater than about 0 wt. % to less than or equal to about 60 wt. % of the carbonaceous capacitor materials and greater than or equal to about 40 wt. % to less than or equal to about 100 wt. % of the sulfide coating.

9. The method of claim 7, wherein the sulfide coating has a thickness of greater than or equal to about 1 nm to less than or equal to about 50 μm and the solid-state electrolyte has an average particle diameter of greater than or equal about 2 nm to less than or equal to about 100 μm.

10. The method of claim 1, wherein the one or more carbonaceous capacitor materials are selected from the group consisting of: activated carbon (AC), graphene, porous carbon, carbon nanotubes (CNTs), and combinations thereof.

11. The method of claim 1, wherein admixing the electrolyte precursor with the one or more additional components includes:

milling a second admixture comprising the electrolyte precursor and the one or more additional components at a speed greater than or equal to about 50 rpm to less than or equal to about 1500 rpm for a second time greater than or equal to about 10 minutes to less than or equal to about 72 hours; and heating the milled second admixture to a second temperature greater than or equal to about 100° C. to less than or equal to about 1200° C. for a first time greater than or equal to about 10 minutes to less than or equal to about 24 hours to form the solid-state electrolyte.

12. The method of claim 1, wherein admixing the electrolyte precursor with the one or more additional components includes:

dispersing the electrolyte precursor and the one or more additional components in a solvent to form a dispersion; and removing liquid from the dispersion by exposing the second admixture to a second temperature greater than or equal to about 50° C. to less than or equal to about 1200° C. for a first time greater than or equal to about 10 minutes to less than or equal to about 48 hours to form the solid-state electrolyte.

13. The method of claim 12, wherein the solvent is selected from the group consisting of: tetrahydrofuran, acetonitrile, hydrazine, methanol, ethanol, ethyl acetate, N-methylformamide, 1,2-dimethoxyethane, and combinations thereof.

14. The method of claim 1, wherein admixing the electrolyte precursor with the one or more additional components further includes:

heating a second admixture comprising the electrolyte precursor and the one or more additional components to a second temperature greater than or equal to about 100° C. to less than or equal to about 1200° C. for a first time greater than or equal to about 10 minutes to less than or equal to about 24 hours; and quenching the second admixture to a third temperature greater than or equal to about −100° C. to less than or equal to about 100° C. to form the solid-state electrolyte.

15. The method of claim 1, wherein admixing the sulfate precursor comprising the one or more of lithium sulfate ($Li_2SO_4$) and lithium sulfate hydrate ($Li_2SO_4.H_2O$) with the one or more carbonaceous capacitor materials to form the first admixture includes a milling process.

16. The method of claim 1, wherein admixing the sulfate precursor comprising the one or more of lithium sulfate ($Li_2SO_4$) and lithium sulfate hydrate ($Li_2SO_4.H_2O$) with the one or more carbonaceous capacitor materials to form the first admixture includes:

dispersing the sulfate precursor and the one or more carbonaceous capacitor materials in a solvent to form a suspension; and adding a precipitant in a dropwise manner to the suspension.

* * * * *